United States Patent

Keith et al.

[11] Patent Number: 5,816,699
[45] Date of Patent: Oct. 6, 1998

[54] TWIN SCREW EXTRUDER BARREL WITH AN EASILY REMOVABLE SEAMLESS INSERT HAVING A WEAR AND CORROSION RESISTANT LINING

[75] Inventors: Larry T. Keith; Martin A. Ronkin, both of Salem, Oreg.

[73] Assignee: Entek Manufacturing Inc., Lebanon, Oreg.

[21] Appl. No.: 874,793

[22] Filed: Jun. 13, 1997

[51] Int. Cl.$^6$ ............................................ B29B 7/80
[52] U.S. Cl. ......................................................... 366/84
[58] Field of Search ........................... 366/69, 79, 83–85, 366/88, 89, 297, 300, 301, 318, 349; 425/204, 208, 209; 419/8, 49; 428/553–558

[56] References Cited

U.S. PATENT DOCUMENTS

| | | | |
|---|---|---|---|
| 3,804,382 | 4/1974 | Pultz | 366/83 X |
| 3,900,188 | 8/1975 | Seufert | 366/79 X |
| 4,028,027 | 6/1977 | Worz | 100/146 X |
| 4,036,540 | 7/1977 | Seufert | 366/83 X |
| 4,117,583 | 10/1978 | Gnadig et al. | 366/83 X |
| 4,133,460 | 1/1979 | Jerpbak | 366/79 X |
| 4,364,664 | 12/1982 | Theysohn | 366/84 |
| 4,376,808 | 3/1983 | Kudinov et al. | 428/564 X |
| 4,383,764 | 5/1983 | Sloin | 366/75 |
| 4,385,876 | 5/1983 | Scherping et al. | 366/85 X |
| 4,519,713 | 5/1985 | Godsey et al. | 366/349 X |
| 4,640,672 | 2/1987 | Ellwood | 366/79 X |
| 4,746,220 | 5/1988 | Sukai et al. | 366/79 |
| 5,110,284 | 5/1992 | Dienst et al. | 366/83 X |
| 5,116,135 | 5/1992 | Kaiser et al. | 366/84 X |
| 5,209,937 | 5/1993 | Kangas | 425/204 X |
| 5,223,345 | 6/1993 | Kaiser et al. | 419/49 X |
| 5,352,539 | 10/1994 | Psiuk | 425/208 X |

Primary Examiner—Charles E. Cooley
Attorney, Agent, or Firm—Robert E. Howard

[57] ABSTRACT

An extruder barrel for twin screw extruders. The barrel body has a removable insert firmly seated in an insert receiving opening extending centrally and longitudinally therethrough. The insert has two circular bores with parallel axes extending centrally and longitudinally therethrough, the bores being in communication along a common chord. The walls of the bores have a wear and corrosion resistant layer that is a powder metallurgical material that is preferably applied by hot isotactic pressing. The preferred powder metallurgical material forming the wear resistant layer is a composition containing at least 50% by weight tungsten carbide with the remainder being nickel. The outer surface of the insert has a thin layer of a heat conductive, malleable material, such as copper, adhered thereto.

19 Claims, 2 Drawing Sheets

TWIN SCREW EXTRUDER BARREL WITH AN EASILY REMOVABLE SEAMLESS INSERT HAVING A WEAR AND CORROSION RESISTANT LINING

BACKGROUND OF THE INVENTION

This invention relates to a wear resistant barrel for use in twin screw extruders.

Twin screw extruders are used in processing thermoplastic resins. In its simplest terms, these types of extruders are comprised of a frame designed to be bolted to a concrete floor, a barrel mounted on the frame, two interconnecting bores extending longitudinally from one end of the barrel to the other, two intermeshing screws located in the two interconnecting bores, and drive means for turning the screws in the same (co-rotating) or opposite (counter-rotating) direction.

The barrels are made of steel and have a cross section that may be cylindrical, rectangular or square. The barrel may be either a single piece or, more commonly, multiple pieces (segments) bolted together. In either case, the bores of the barrel are lined with a wear resistant alloy to resist corrosion and abrasion by the thermoplastic material being processed, particularly where the thermoplastic material contains large amounts of an abrasive filler.

The barrel bores are lined with a layer of a wear and/or corrosion resistant alloy by various techniques, such as nitriding, thermal spraying, plasma deposition, welding, centrifugal casting, etc. It is difficult to accurately machine and polish such layers because of their wear resistant nature.

More recently it has been suggested to line barrels with a layer of a wear resistant alloy by hot isotactic pressing ("HIP") of a powdered alloy. See, for example, U.S. Pat. Nos. 5,223,345 and 5,352,539. Applying a wear resistant lining by HIP provides a layer that requires little or no machining and that does not suffer from defects such as crack formation, pore formation and distortion sometimes found with linings applied by other techniques.

It is also known to provide such wear resistant surfaces by inserting a pre-formed wear resistant sleeve into the barrel bores. Such sleeves are formed from two separate steel tubes welded together along longitudinal seams. The welded seams are subject to cracking which allows the thermoplastic material being processed to flow behind the liner and squeeze the liner into contact with the screws.

Regardless of how such barrels have been lined with a wear resistant material, the barrel lining eventually wears out in use and must be replaced. With a nitrided barrel lining the entire barrel (whether a single piece or segmented) must be taken out of service and discarded. Worn sleeve linings must be machined out of the barrel and replaced with a new sleeve.

It is an object of this invention to provide an improved wear resistant lining for twin screw extruder barrels. It is another object to provide a wear resistant lining that is easily replaceable.

SUMMARY OF THE INVENTION

The objects of this invention are achieved by providing an insert for a twin screw extruder barrel or barrel segment that is easy to insert and remove from a barrel. The barrel insert of the invention is a seamless body having two circular bores extending centrally and longitudinally therethrough, the circular bores being in communication with each other along a common chord. The walls of the bores of the insert are layered with a consolidated, wear and corrosion resistant, powder metallurgical composition. The powder metallurgical composition is preferably formed on the bore walls by hot isotactic pressing, but may be formed by plasma arc welding with a plasma torch heated by an a-c or d-c arc. The outer surface of the insert body is covered with a thin layer of a heat conductive, malleable material, such as copper.

DESCRIPTION OF THE PREFERRED EMBODIMENTS

Figure 1:
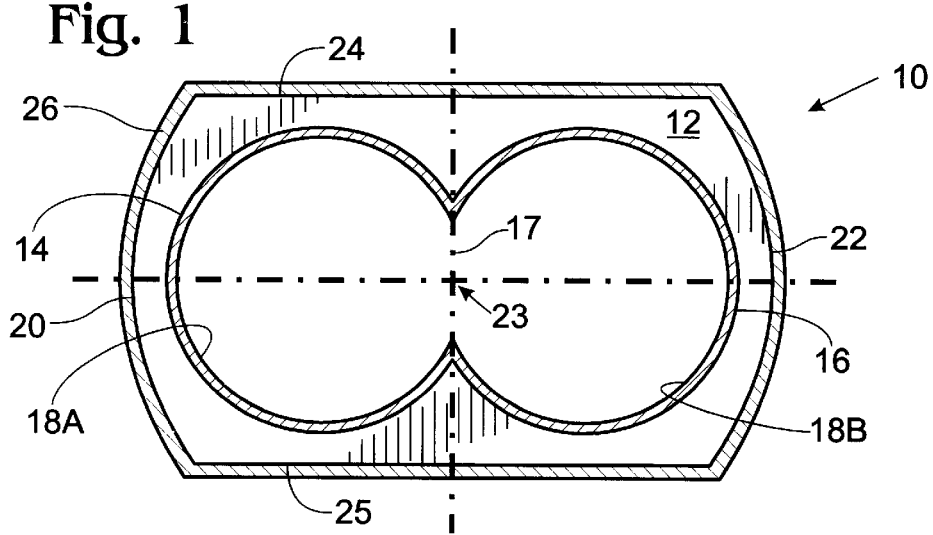
FIG. 1 is a transverse view in cross section of the insert of this invention.

A transverse view in cross section of insert 10 is shown in FIG. 1. Insert 10 is comprised of a steel body 12 into which has been formed two circular bores 14 and 16 which extend centrally and longitudinally through body 12. Bores 14 and 16 communicate with each other along a common chord 17.

The walls of bores 14 and 16 have wear and corrosion resistant layers 18A and 18B, respectively, adhered thereto.

Body 12 of insert 10 has planar upper and lower surfaces 24 and 25, respectively, and arcuate sides 20 and 22. Arcuate sides 20 and 22 are arcs of a common circle whose center is located at the middle 23 of common chord 17.

A thin layer (about 0.002 inch) of copper 26 is applied to the outer surface of steel body 12 of insert 10. Copper layer 26 may be applied by thermal spraying, electroplating, chemical plating or other suitable application methods. Other heat conducing, malleable materials may be substituted for copper.

Figure 2:
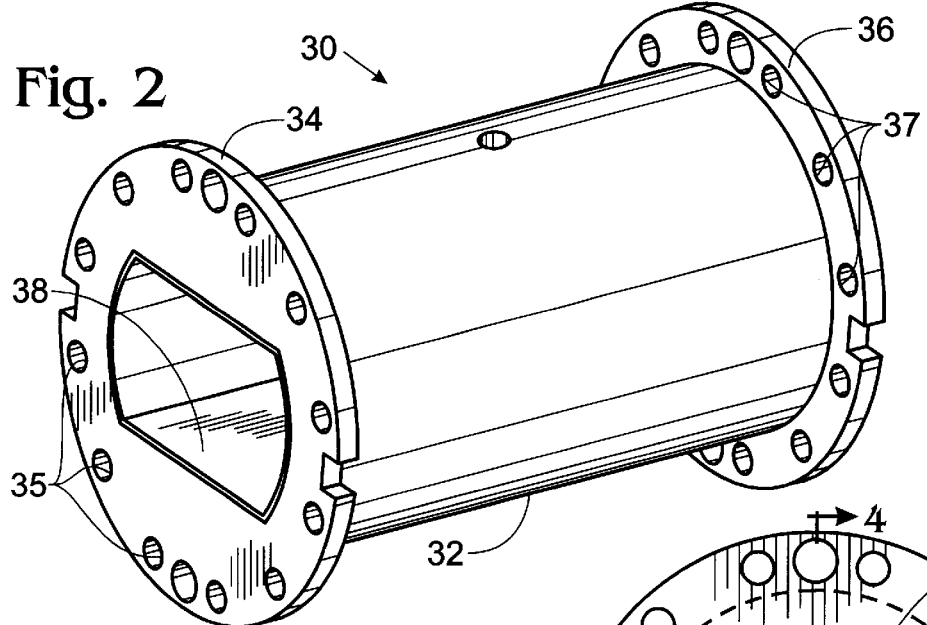
FIG. 2 is a perspective view of a barrel segment into which the insert of this invention is to be placed.

Barrel segment 30 is illustrated in FIG. 2. Barrel segment 30 is comprised of a cylindrical steel body 32 having a flange 34 at one outer end and a flange 36 at the other outer end. Flange 34 has a plurality of bolt holes 35 drilled therein to permit attaching barrel segment 30 with bolts to a similar barrel segment to form a segmented barrel. Similarly, flange 36 has a plurality of bolt holes 37 drilled therein. A plurality of barrel segments 30 are bolted together to form a segmented barrel having the desired length to diameter ratio, as is known in the art.

Insert receiving opening 38 has been centrally machined in cylindrical body 32 and extends longitudinally therethrough from one end to the other. Opening 38 is of the same shape and size as the perimeter of insert 10.

Figure 3:
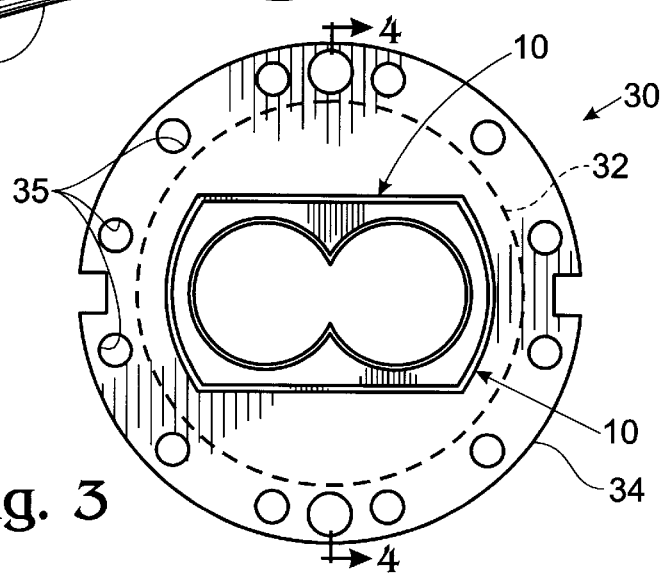
FIG. 3 is an end elevational view of a barrel segment containing the insert of this invention.
Figure 4:
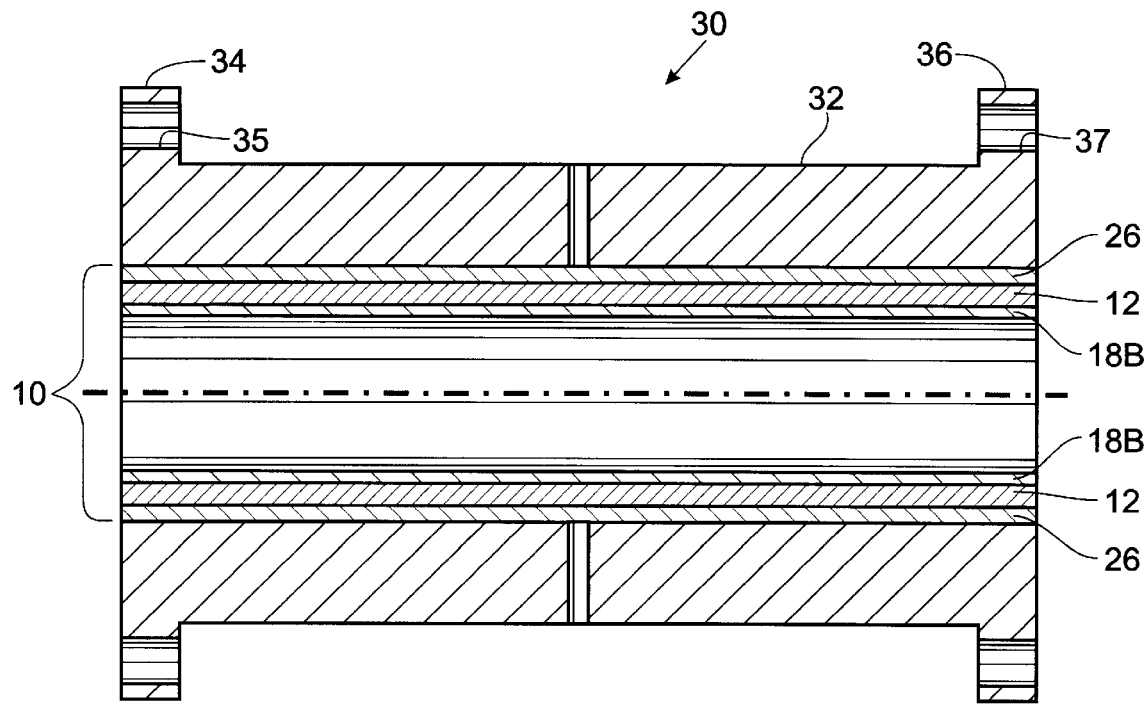
FIG. 4 is a side elevational view in cross section of a barrel segment containing the insert of this invention, taken along line 4—4 of FIG. 3.

FIGS. 3 and 4 illustrate the barrel 30 having insert 10 firmly seated in opening 38 thereof.

In firmly seating insert 10 into opening 38 of barrel segment 30, barrel segment 30 is first heated to slightly expand the size of opening 38, insert 10 placed therein, and barrel segment 30 allowed to cool. The copper of layer 26, being malleable, is extruded into any irregularities in machined opening 38 by the pressure applied to insert 10 resulting from shrinkage of barrel body 32 curing cooling. A tight fit is thus achieved.

When insert 10 needs replacing, it is punched out of barrel segment 30 and substituted with a replacement insert. The ability to punch out insert 10 is enhanced by the lubricity provided by copper layer 26.

The preferred method of applying the wear and corrosion resistant layers 18A and 18B to the walls of bores 14 and 16 is by hot isotactic pressing a powder metallurgical composition thereto. Hot isotactic pressing is a well known art and the process forms no part of this invention. However, the process as used in forming the insert 10 of this invention will be generally described.

Figure 5:
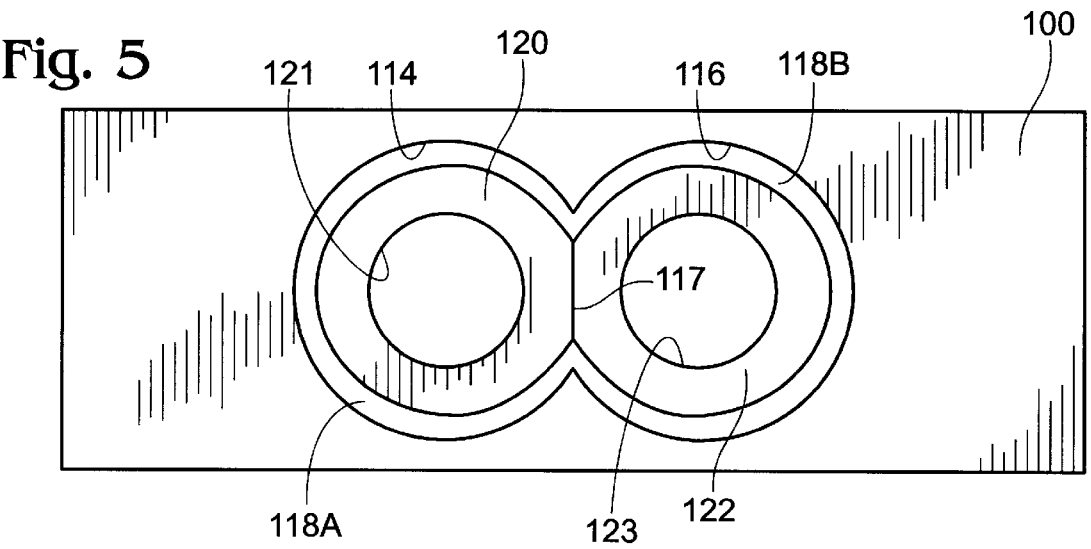
FIG. 5 is a view in cross section of the blank used to form the insert of this invention.

As shown in FIG. 5, a steel block 100 that is rectangular in cross section has two adjacent circular bores 114 and 116 centrally and longitudinally machined therethrough. Circular bores 114 and 116 have parallel axes and interconnect along a common chord 117. Two cylindrical cores 120 and 122 of soft steel are inserted into bores 114 and 116 as shown. Cylindrical cores 120 and 122 are hollow, having openings 121 and 123, respectively, extending longitudinally therethrough. Cylindrical cores 120 and 122 have an outer diameter less than that of adjacent bores 114 and 116, the difference in diameter representing the thickness of the wear and corrosion resistant layer to be applied. The outer ends of cores 120 and 122 are held in place by steel plates (not shown) removably attached to both ends of block 100.

The space 118A between the wall of bore 114 and the outer surface of core 120, and the space 118B between the wall of bore 116 and the outer surface of core 122, is filled with a metal powder composite selected to provide the desired wear and corrosion resistant layer.

Openings 121 and 123 in cores 120 and 122 and the space containing the metal powder composite is first evacuated by application of a vacuum thereto, and the block 100 then subjected to a high temperature and high pressure argon gas. Temperatures of up to 1,230 degrees C. or higher and pressures of up to 15,000 psi are used in the HIP process. The HIP process consolidates the metal powder composite into a dense, wear and corrosion resistant layer adhered to the walls of bores 114 and 116. Some diffusion of the metal into the wall of the adjacent bore takes place.

The end plates are removed from block 100. The outer surface of block 100 is machined rectangularly by removing any deformities caused by the HIP process, and soft steel cores 120 and 122 removed by machining.

The block 100 is then placed into a lathe and machined into the shape shown in FIG. 1 where arcuate sides 20 and 22 are arcs of a common circle having its center 23 at the middle of common chord 17. By providing sides 20 and 22 with an arcuate shape, a more uniform mass of material for heat transfer is provided between heated barrel 30 and the thermoplastic material being processed in bores 14 and 16 of insert 10.

The powder metallurgical material used to form wear and corrosion resistant layer 18 can be any powder metallurgical material which will provide the desired wear and corrosion resistance upon consolidation.

Although consolidation of the wear and corrosion resistant layer 18 is preferably accomplished by using hot isotactic pressing, layer 18 may be applied by plasma arc welding.

The thickness of the wear and corrosion resistant layer 18 may be between about 0.060 and about 0.100 inch.

A preferred powder metallurgical material for forming wear resistant layer 18 is a composition comprised of more than 50% by weight tungsten carbide and less than 50% nickel. Preferably, such material contains from about 51% to about 90% by weight tungsten carbide and about 10% to about 49% by weight nickel. Other minor ingredients in amounts constituting impurities may be present.

The particle size of the powder metallurgical material used to form layer 18 may be within the range typically used for the HIP process. For the preferred material described above, the particle size of at least 95% by weight of the material is preferably between about 40 and about 120 micrometers.

Illustrative of the preferred powder metallurgical material described above are Nitung 60 and Nitung 70 sold by Plasma Consultants, Inc.

Whenever the term "extruder barrel" is used herein, it is intended to include both a single piece or segmented barrel.

The invention claimed is:

1. An extruder barrel for a twin screw extruder comprising:
   a barrel body having an insert receiving opening extending centrally and longitudinally therethrough;
   a removable insert firmly seated in said insert receiving opening of said barrel body;
   said insert comprising a seamless insert body having upper and lower planar surfaces and arcuate sides, said body having two circular bores having parallel axes extending centrally and longitudinally therethrough, said circular bores being in communication with each other along a common chord; the walls of said circular bores having a wear and corrosion resistant layer formed of a consolidated powder metallurgical material adhered to said walls;
   and a thin layer of a heat conductive, malleable material adhered to the outer surface of said insert body.

2. The extruder barrel of claim 1 wherein said wear and corrosion resistant layer is formed of a consolidated powder metallurgical material comprising between about 51% and about 90% by weight tungsten carbide and between about 10% and about 49% by weight nickel.

3. The extruder barrel of claim 2 wherein at least 95% by weight of said powder metallurgical material has a particle size between about 40 and about 120 micrometers.

4. The extruder barrel of claim 1 wherein said wear and corrosion resistant layer is formed of a consolidated powder metallurgical material applied by hot isotactic pressing.

5. The extruder barrel of claim 4 wherein said wear and corrosion resistant layer is formed of a consolidated powder metallurgical material comprised of between about 51% and about 90% by weight tungsten carbide and between about 10% and about 49% by weight nickel.

6. The extruder barrel of claim 5 wherein at least 95% by weight of said powder metallurgical material has a particle size between about 40 and about 120 micrometers.

7. The extruder barrel of claim 1 wherein said wear and corrosion resistant layer is formed of a consolidated powder metallurgical material applied by plasma arc welding.

8. The extruder barrel of claim 7 wherein said wear and corrosion resistant layer is formed of a consolidated powder metallurgical material comprised of between about 51% and about 90% by weight tungsten carbide and between about 10% and about 49% by weight nickel.

9. The extruder barrel of claim 8 wherein at least 95% by weight of said powder metallurgical material has a particle size between about 40 and about 120 micrometers.

10. The extruder barrel of claim 1 wherein said thin layer of heat conductive, malleable material on said insert is copper.

11. The extruder barrel of claim 10 wherein said thin copper layer is about 0.002 inch thick.

12. The extruder barrel of claim 1 wherein said arcuate sides of said insert are arcs of a circle whose center is located at the midpoint of said common chord.

13. An insert for a twin screw extruder barrel comprising a seamless insert body having upper and lower planar surfaces and arcuate sides, said body having two circular bores having parallel axes extending centrally and longitudinally therethrough, said circular bores being in communication with each other along a common chord; the walls of said circular bores having a wear and corrosion resistant layer formed of a consolidated powder metallurgical material adhered to said walls; and a thin layer of heat conductive, malleable material adhered to the outer surface of said insert body.

14. The insert of claim 13 wherein said wear and corrosion resistant layer is formed of a consolidated powder metallurgical, material applied by hot isotactic pressing.

15. The insert of claim 14 wherein said wear and corrosion resistant layer is formed of a consolidated powder metallurgical material comprised of between about 51% and about 90% by weight tungsten carbide and between about 10% and about 49% by weight nickel.

16. The insert of claim 13 wherein said wear and corrosion resistant layer is formed of a consolidated powder metallurgical material applied by plasma arc welding.

17. The insert of claim 16 wherein said wear and corrosion resistant layer is formed of a consolidated powder metallurgical material comprised of between about 51% and about 90% by weight tungsten carbide and between about 10% and about 49% by weight nickel.

18. The insert of claim 13 wherein said thin layer of heat conductive, malleable material adhered to the outer surface of said insert body is copper.

19. The insert of claim 18 wherein said thin layer of copper has a thickness of about 0.002 inch.

* * * * *